United States Patent
Kudoh et al.

(10) Patent No.: US 8,220,465 B2
(45) Date of Patent: Jul. 17, 2012

(54) WALKING ASSISTANCE DEVICE

(75) Inventors: Hiroshi Kudoh, Wako (JP); Yasushi Ikeuchi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 572 days.

(21) Appl. No.: 12/377,954

(22) PCT Filed: Jul. 13, 2007

(86) PCT No.: PCT/JP2007/063985
§ 371 (c)(1),
(2), (4) Date: Feb. 18, 2009

(87) PCT Pub. No.: WO2008/023504
PCT Pub. Date: Feb. 28, 2008

(65) Prior Publication Data
US 2010/0063424 A1    Mar. 11, 2010

(30) Foreign Application Priority Data
Aug. 22, 2006    (JP) ................... 2006-224800

(51) Int. Cl.
*A61G 15/00* (2006.01)
(52) U.S. Cl. ...................................... 128/845
(58) Field of Classification Search .............. 128/845, 128/846; 482/66, 68
See application file for complete search history.

(56) References Cited

U.S. PATENT DOCUMENTS

| | | | | |
|---|---|---|---|---|
| 1,494,178 A | * | 5/1924 | Mark | 248/577 |
| D258,854 S | * | 4/1981 | Berg | D6/354 |
| 4,872,665 A | | 10/1989 | Chareire | |
| 5,702,326 A | | 12/1997 | Renteria | |
| 5,732,964 A | | 3/1998 | Durham et al. | |
| 6,056,673 A | | 5/2000 | Arrecis | |
| 7,883,483 B2 | * | 2/2011 | Ido et al. | 601/5 |

FOREIGN PATENT DOCUMENTS

| | | |
|---|---|---|
| CN | 85107981 | 7/1986 |
| CN | 2191150 Y | 9/1999 |
| DE | 202 18 875 | 3/2003 |
| EP | 1 726 281 | 11/2006 |
| FR | 2 589 360 | 5/1987 |
| FR | 2 745 714 | 9/1997 |
| JP | 3-505690 | 12/1991 |
| JP | 05-329186 | 12/1993 |
| JP | 07-112035 | 5/1995 |
| JP | 2001-095865 | 4/2001 |
| JP | 2005-169052 | 6/2005 |

* cited by examiner

*Primary Examiner* — Patricia Bianco
*Assistant Examiner* — Camtu Nguyen
(74) *Attorney, Agent, or Firm* — Rankin, Hill & Clark LLP (57) ABSTRACT

A walking assistance device having a seating member (1) on which a user (P) can sit astride, and support members (2L, 2R) which support the seating member (1). The seating member (1) has a backward movement prevention section (1b) for preventing the seating member (1) from being displaced backward relative to the user (P) sitting on the seating member (1). The backward movement prevention section (1b) is constructed so as to be in contact with an inguinal part (Q) of the user (P). The arrangement restrains backward dislocation of the seating member (1) relative to the user (P), thus permitting improved stability when the user is seated.

14 Claims, 5 Drawing Sheets

WALKING ASSISTANCE DEVICE

BACKGROUND OF THE INVENTION

1. Technical Field

The present invention relates to a walking assistance device adapted to assist the walking of a user, such as a senior citizen or a walking-disabled person.

2. Description of the Related Art

As an apparatus for assisting a user in walking, there has been known a walking assistance device which has a saddle-shaped seat as a seating member on which a user can sit and which is capable of moving as the user walks, as disclosed in Japanese Patent No. 3156367. The seat is formed in a U-shape as observed sideways such that it longitudinally holds the hip portion of the user. The surface of the seat is provided with a detector with pressure sensors for detecting forces applied by the walker. Each of both sides of the seat is provided with a multi-joint leg composed of a main leg and an auxiliary leg arranged in a longitudinal direction. Each of the main leg and the auxiliary leg is formed of a multi-joint mechanism equipped with a single joint or a plurality of joints. Each joint of the legs has a joint drive mechanism constructed of a drive motor or a speed reducer. The distal end of the main leg is provided with a drive wheel having a rotary drive mechanism, a clutch, and a brake, while the distal end of the auxiliary leg is provided with a driven wheel which freely rotates.

In the walking assistance device equipped with the aforesaid seat as the seating member, the front of the seat comes in contact with the hypogastric region of the walker. Hence, while walking, the seat tends to push the soft hypogastric region and dislocate itself backward. Further, the legs and the seat interfere with each other while walking, causing the walking assistance device to rotate about a vertical axis with resultant impaired stability.

SUMMARY OF THE INVENTION

An object of the present invention is to provide a walking assistance device capable of restraining a seating member from being dislocated backward relative to a user, thereby permitting improved stability to be achieved when the user is sitting thereon.

According to the present invention, there is provided a walking assistance device comprising a seating member on which a user can sit astride, and a support member which supports the seating member, wherein the seating member has a backward movement prevention section for preventing the seating member from being displaced backward relative to the user sitting thereon, and the backward movement prevention section is constructed to come in contact with the inguinal region of the user.

In the walking assistance device according to the present invention, the front end of the portion which comes in contact with a user sitting on the seating member comes in contact with the inguinal region of the user. Here, the inguinal region is the region wherein a leg connects to the trunk on the front side of a human body, and the region forms a trough between the hypogastric region and the root of a leg. When the user sits, the front end of the seating member abuts against the trough, so that the seating member is firmly held, thereby preventing the seating member from being dislocated toward the rear while walking. Thus, a walking assistance device capable of achieving improved stability while sitting is provided.

In the walking assistance device according to the present invention, the backward movement prevention section of the seating member is preferably formed in a bifurcate shape which splits to right and left. This allows the backward movement prevention section to easily flex laterally, so that even when a leg swung toward the front of the user abuts against the seating member, the abutting force is absorbed by the flexure of the backward movement prevention section so as to restrain the yawing of the seating member caused by the abutting of the leg. In other words, the torque about the vertical axis applied from the seating member to the user can be reduced.

The bifurcate shape of the backward movement prevention section is not limited to the one described above; the backward movement prevention section may have any other shape as long as it has a bifurcate portion which comes in contact with at least the inguinal region of the user. For example, the backward movement prevention section may have a bifurcate portion and the distal ends thereof are joined or the bifurcate portion may be filled with a member having a low degree of elasticity.

Preferably, the backward movement prevention section of the seating member is formed such that the degree of elasticity in the longitudinal direction is larger than the degree of elasticity in the lateral direction. Here, the degree of elasticity in the lateral direction of the backward movement prevention section is desirably relatively small to prevent the yawing of the seating member. However, if the degree of elasticity in the longitudinal direction of the backward movement prevention section is set to be also small, then the backward movement prevention section tends to flex in the longitudinal direction when it comes in contact with the user, possibly causing the seating member to be dislocated toward the rear in relation to the user. However, forming the backward movement prevention section such that the degree of elasticity in the longitudinal direction is higher makes it possible to restrain the flexure of the backward movement prevention section in the longitudinal direction, thus making it possible to prevent the seating member from being dislocated toward the rear relative to the user.

Further preferably, the seating member has a forward movement prevention section which comes in contact with the back of the body of the user to prevent the seating member from being dislocated toward the front. This arrangement makes it possible to restrain the seating member from being dislocated forward relative to the user.

DETAILED DESCRIPTION OF THE PREFERRED EMBODIMENTS

The following will explain a walking assistance device in accordance with an embodiment of the present invention.

Figure 1:
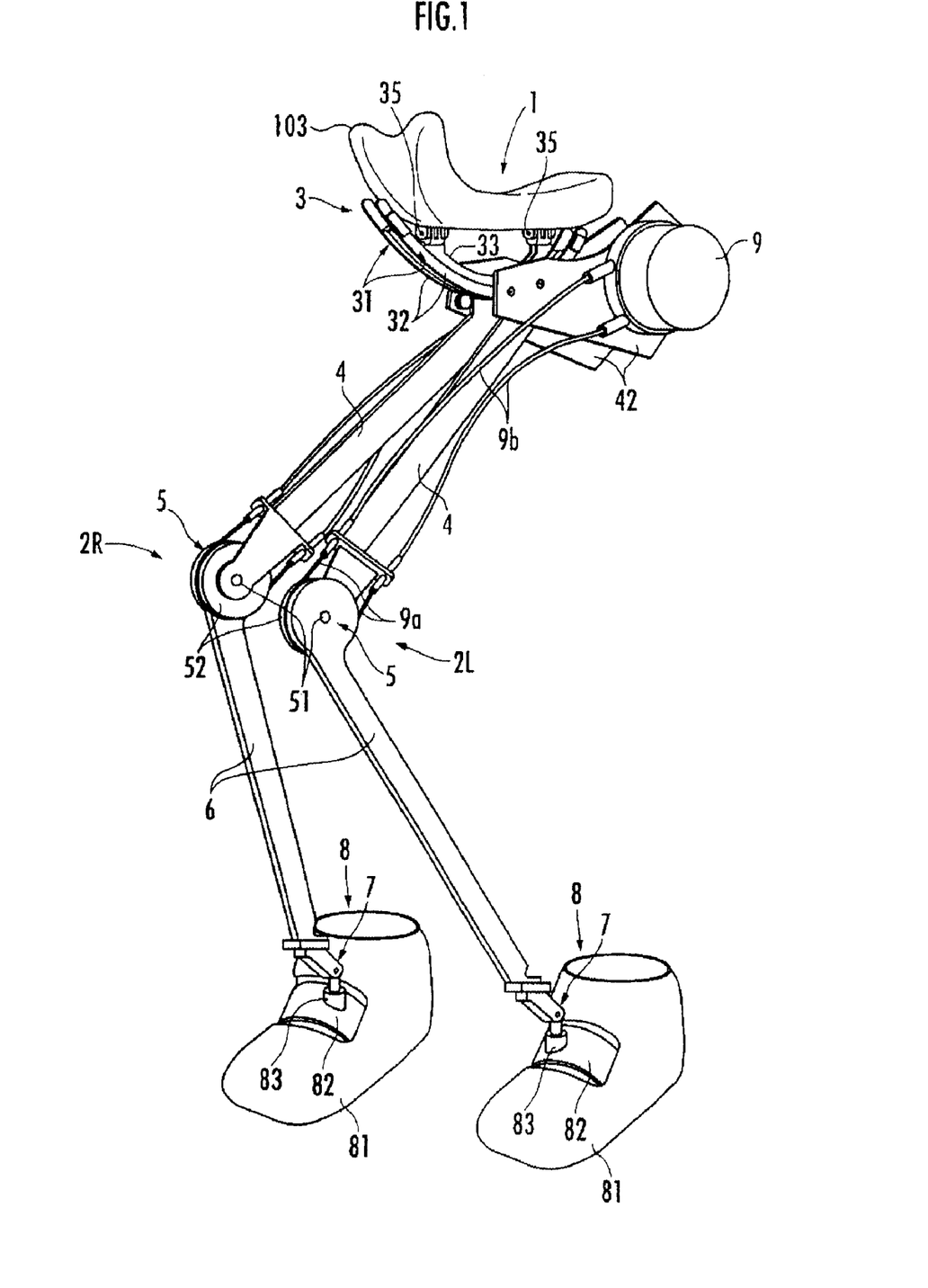
FIG. 1 is a perspective view of a walking assistance device according to a first embodiment of the present invention.
Figure 2:
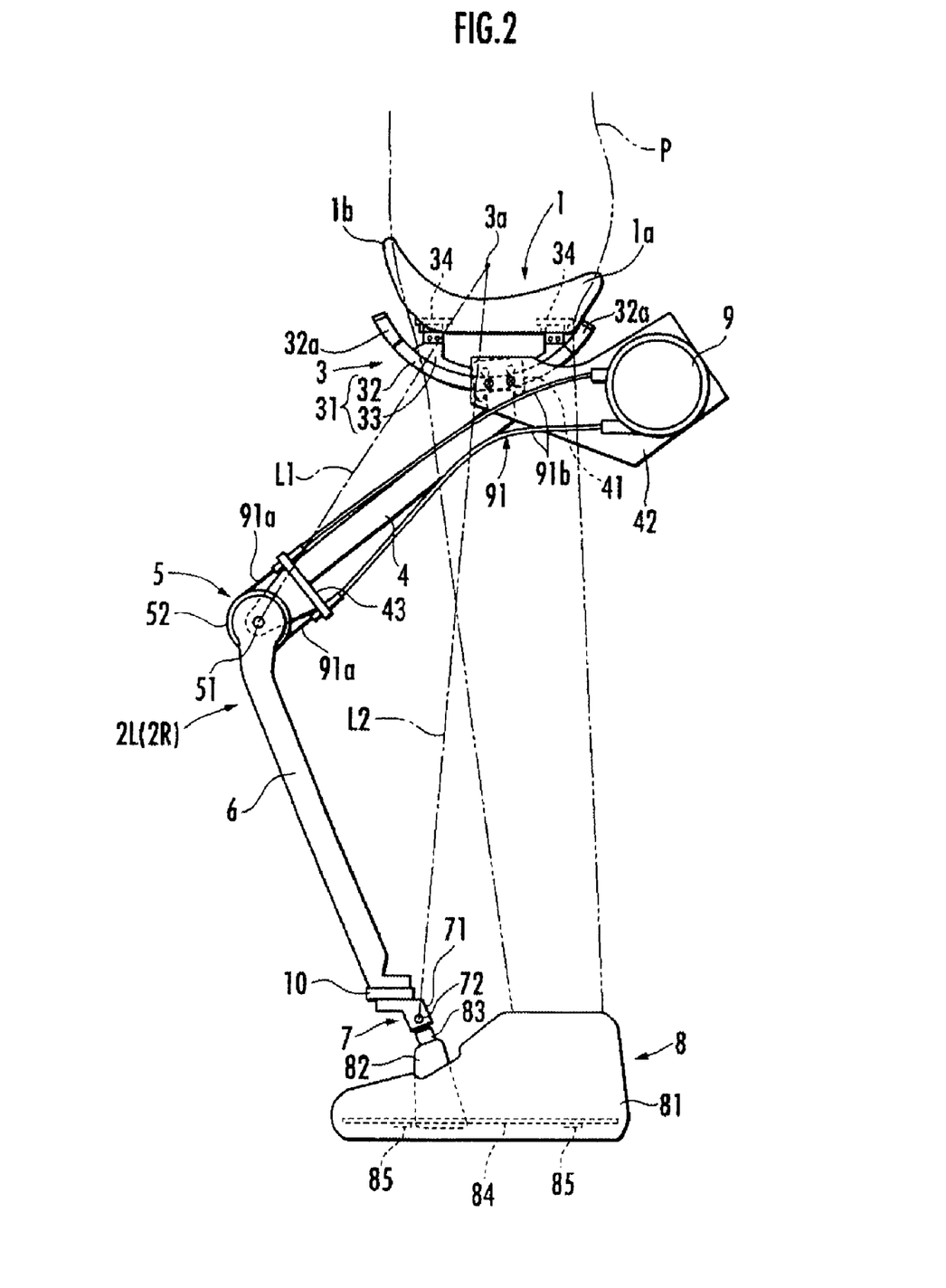
FIG. 2 is a side view of the walking assistance device according to the first embodiment.
Figure 3:
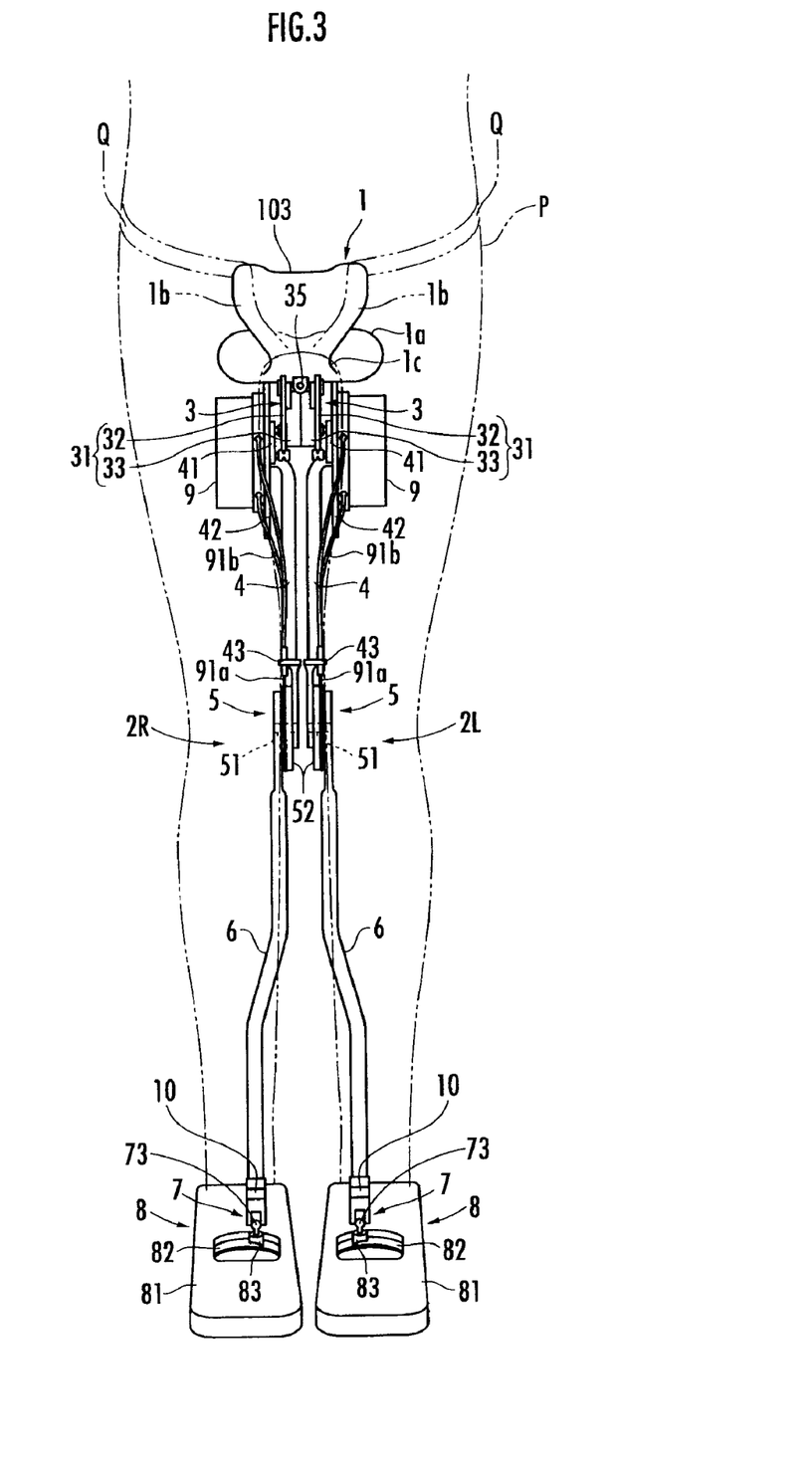
FIG. 3 is a front view of the walking assistance device according to the first embodiment.

The walking assistance device illustrated in FIG. 1 to FIG. 3 is equipped with a seating member 1 constituting a seat on which a user P sits astride, and a pair of right and left leg links 2L and 2R as support members which support the seating member 1.

Each of the leg links 2L and 2R is constructed of a bendable/stretchable link equipped with a first link 4 connected to a first joint 3 provided on the lower surface of the seating member 1 and a second link 6 connected to the lower end of the first link 4 through the intermediary of a rotary second joint 5. Further, a ground contact member 8, which is attached to each of the right and left feet of the user, is connected to the lower end of the second link 6 through the intermediary of a third joint 7. Further, a drive source 9 for the second joint 5 is mounted on each of the leg links 2L and 2R. The drive source 9 rotatively drives the second joint 5 to apply a force to each of the leg links 2L and 2R in the direction for increasing the distance between the ground contact member 8 and the seating member 1 and generates a support force for supporting at least a part of the weight of the user (hereinafter referred to as "the weight-free assisting force"). The weight-free assisting force generated in each of the leg links 2L and 2R is transmitted to the trunk of the user P through the intermediary of the seating member 1, reducing the load acting on a leg of the user P.

The first joint 3 is disposed to be positioned within the lateral width between the right and left femoral heads of the user when the user sits on the seating member 1. Thus, the weight-free assisting force acts on the seating member 1 between the right and left femoral heads of the user, so that the weight-free assisting force is securely transmitted to the trunk of the user.

The walking assistance device according to the present embodiment enables the user P to use it with almost no constrained feeling simply by attaching the ground contact members 8 to his/her feet and sitting on the seating member 1. Further, the first joint 3 and the first link 4 of each of the leg links 2L and 2R are positioned below the crotch of the user P, so that the hands of the user do not hit the first joint 3 or the first link 4 when the user swings his/her arms while walking, thus permitting free arm swing. Moreover, the compactness of the device permits use in a small place in addition to the reduced constraint feeling and the secured freedom of arm swing leads to significantly improved user-friendliness.

Figure 4:
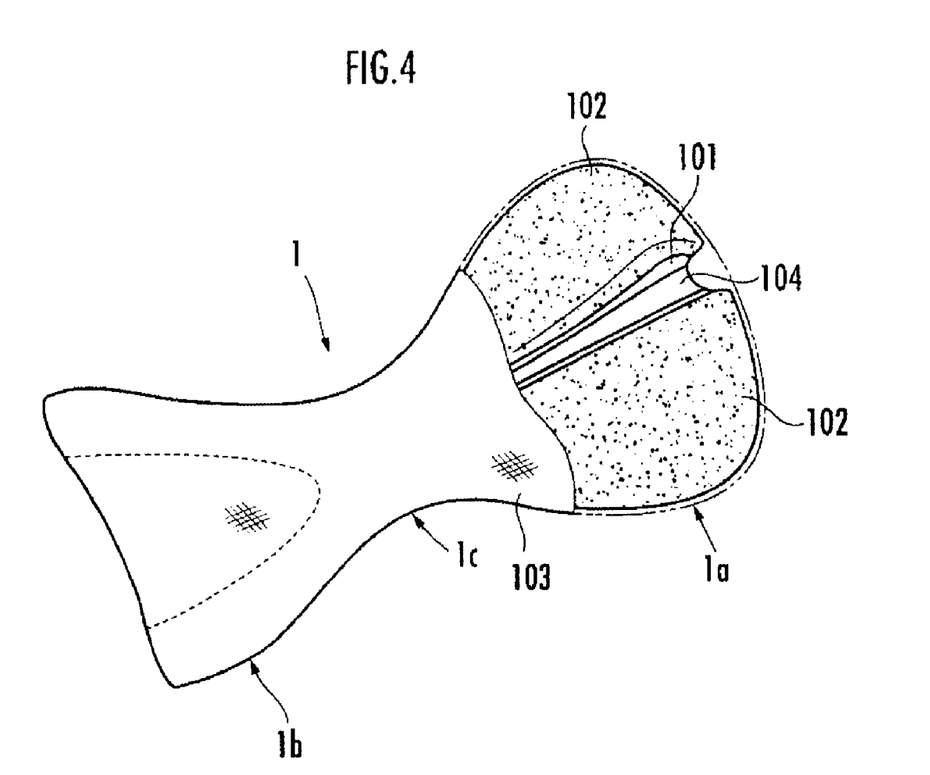
FIG. 4 is a perspective view of a seating member of the walking assistance device according to the first embodiment.

As illustrated in FIG. 4, the seating member 1 has a seating section with a narrowed portion 1c at the middle thereof in the longitudinal direction. The narrowed portion 1c has a lateral width which is smaller than those of a rear portion 1a and a front portion 1b. The front portion 1b is curved upward and formed to have a large lateral width as with the rear portion 1a. The entire seating section has a U-shape, as observed sideways, so as to wrap the crotch of the user sitting thereon.

According to the present embodiment, the seating member 1 is composed of a lining member 101 made of a carbon fiber or the like. A cushion member 102 is attached to the upper surface of the lining member 101, and the lining member 101 and the cushion member 102 are covered by a cover 103, thereby forming the seating section.

Figure 5:
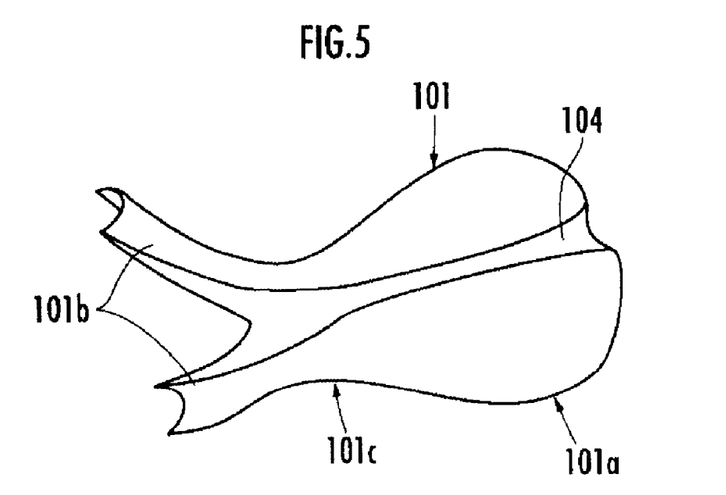
FIG. 5 is a perspective view of the seating member observed from the face of a lining member thereof.

As illustrated in FIG. 5, in the lining member 101, a front portion 101b is formed into a bifurcate shape with the lateral middle portion thereof cut out, and the right surface, which is the upper surface, has a groove or a trough 104 extending at the lateral center from the front portion 101b via the narrowed portion 1c to a rear portion 101a. Cushion members 102 are attached to both sides of the trough 104. Further, each of the bifurcate portions of the front portion 101b is formed to have an arched section.

The wrong surface, which is the lower surface, is formed to be substantially flat from the lower end of the front portion 101b curved upward to the rear portion 101a, and the peripheral portion of the lining member 101 is formed to be thin so as to flexibly absorb a abutting force laterally applied by a leg.

According to the present embodiment, as illustrated in FIG. 2 and FIG. 3, the user P sits on the seating member 1 covered with the cover 103 such that his/her right and left legs are positioned on both sides of the narrowed portion 1c in the lateral direction. At this time, the front portion 1b of the seating member 1 comes in contact with an inguinal part Q of the user P. This arrangement firmly holds the seating member 1, preventing the seating member 1 from being dislocated toward the rear when the user P walks. In other words, the front portion 1b of the seating member 1 functions as the backward movement prevention section which prevents the seating member from being dislocated backward relative to the user.

Further, the lateral width of the rear portion 1a of the seating member 1 is larger than the narrowed portion 1c at the middle, so that the rear portion 1a comes in contact with the roots of the legs at the back side of the body of the user, more specifically, at the portion seen when the user is viewed from behind, thus functioning as a forward movement prevention section which prevents the seating member 1 from being dislocated forward relative to the user. Further, the rear portion 1a has a sufficient lateral width (e.g., max. 120 mm) for receiving the right and left ischiadic bones of the user, making it possible to securely transmit a weight-free assisting force to the user by the contact with the ischiadic bones.

According to the present embodiment, the rear portion 1a and the front portion 1b of the seating member 1, which have larger widths, restrain the seating member 1 from being longitudinally dislocated with respect to the user, as described above, thus allowing the user to stably sit in the longitudinal direction.

Furthermore, the bifurcate shape of the front portion 101b of the lining member 101 constituting the seating member 1 leads to a reduced degree of elasticity in the lateral direction, thus causing the front portion 1b, which constitutes the backward movement prevention section of the seating member 1, to easily flex in the lateral direction. Hence, even if a leg swinging out forward abuts against the front portion 1b of the seating member 1, the abutting force is absorbed by the flexure of the front portion 1b, making it possible to reduce the rotational force about the vertical axis applied to the user from the seating member 1 due to the abutting of the leg.

Further, the section of each of the bifurcate portions of the front portion 101b has an arched shape, resulting in an increased degree of elasticity in the longitudinal direction. This restrains the front portion 101b from flexing in the longitudinal direction, making it possible to prevent the seating member 1 from being dislocated backward relative to the user due to the longitudinal flexure of the front portion 101b.

Even if the portion 1b of the seating member 1 is not formed to have the bifurcate shape, it is possible to make the front portion 1b of the seating member 1 to easily flex in the lateral direction but hard to flex in the longitudinal direction by forming the front portion 1b to have a higher degree of elasticity in the longitudinal direction than the degree of elasticity in the lateral direction, for example, by installing an elastic member along the central line in the lateral direction (a line extending in the longitudinal direction, passing the lateral center). This makes it possible to provide the same advantage as that obtained when the bifurcate shape is used.

As described above, the seating member 1 has an ingenious configuration, such as the shape of the seating surface which considers the condition of the crotch or contacting portions and the like of the user when the user is sitting thereon. The present embodiment includes various ingenious designs to further stabilize the seating member 1. The following will describe the various ingenious designs.

Figure 6:
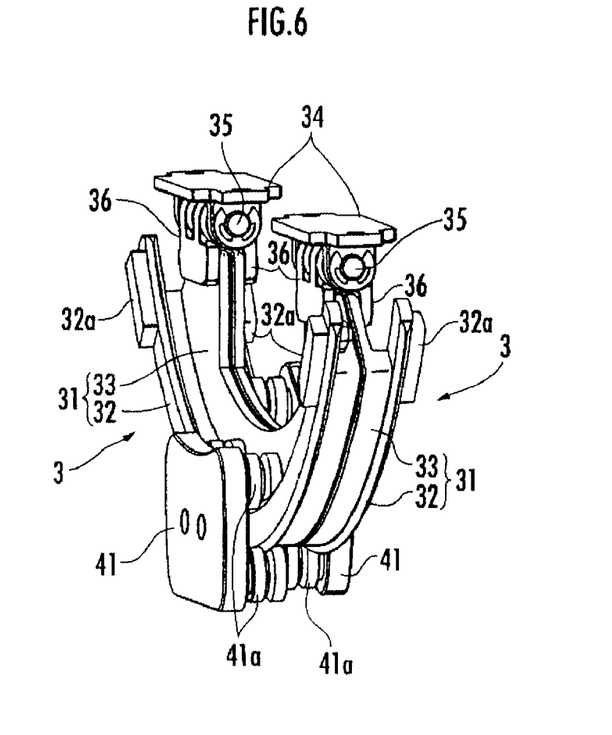
FIG. 6 is a perspective view of a first joint of the first embodiment.
Figure 7:
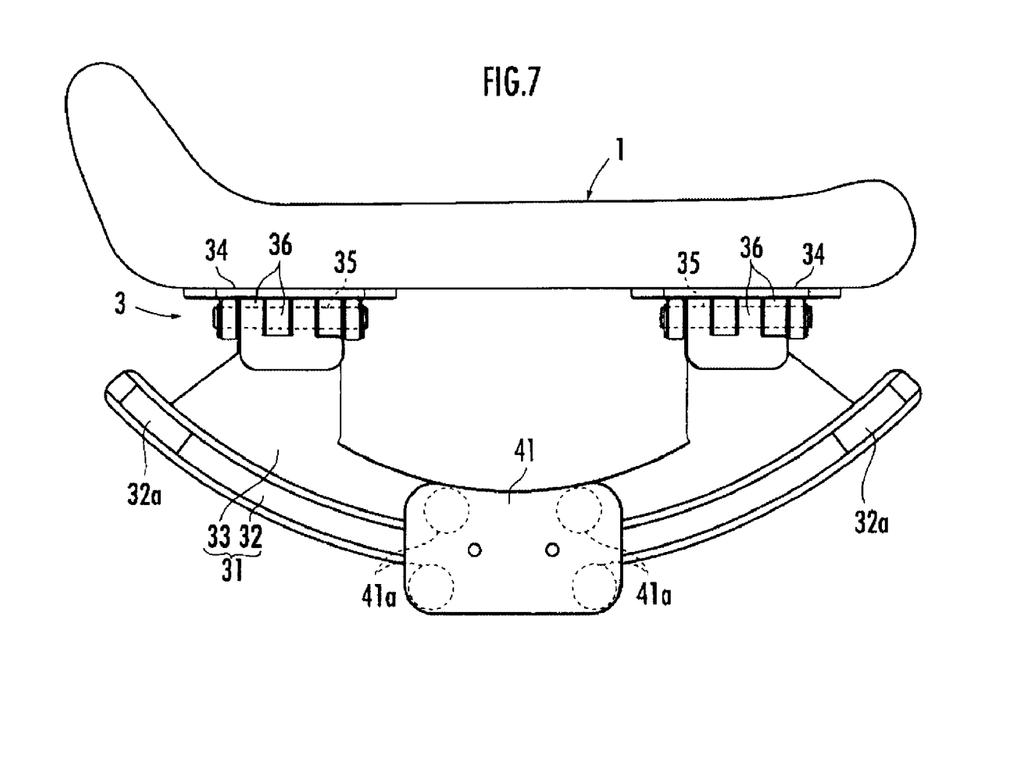
FIG. 7 is a side view of the seating portion of the first embodiment.

As illustrated in FIG. 6 and FIG. 7, each of the first joints 3 for the leg links 2L and 2R is constructed of a joint member 31 having an arcuate guide rail 32, which is lengthy in the longitudinal direction, and a support plate 33, which supports the guide rail 32. Incidentally, the guide rail 32 can be alternatively composed of an arcuate groove formed in the support plate 33.

A slider 41 having a pair of upper and lower rollers 41*a* which vertically clamp the guide rail 32 is attached to the upper end of the first link 4 of each of the leg links 2L and 2R. The slider 41 movably engages with the guide rail 32 through the intermediary of the rollers 41*a*. Thus, each of the leg links 2L and 2R longitudinally swings, with the curvature center of the guide rail 32 as the swing center, and the longitudinal swing support point of each of the leg links 2L and 2R provides the curvature center of the guide rail 32.

As illustrated in FIG. 2, the curvature center of the guide rail 32, i.e., a longitudinal swing support point 3*a* of each of the leg links 2L and 2R in each of the first joints 3 is positioned above the seating member 1. Here, if the action point of the weight of the upper body of the user P with respect to the seating member 1 is shifted toward the front of the longitudinal swing support point 3*a* of each of the leg links 2L and 2R when, for example, the user P tilts his/her upper body forward, then the seating member 1 tilts down toward the front. If the seating member 1 continues to tilt down toward the front, then the seating member 1 will be dislocated backward relative to the user P. According to the present embodiment, however, the action point of the weight will be displaced toward the rear below the swing support point 3*a* as the seating member 1 tilts down toward the front, causing the longitudinal distance between the support point 3*a* and the action point of the weight to be reduced with a resultant reduced rotational moment acting on the seating member 1. Then, when the action point of the weight is displaced to the position right below the swing support point 3*a*, the rotational moment acting on the seating member 1 reaches zero, and the seating member 1 is stabilized in this state. Thus, the seating member 1 automatically converges to a stable state, making it possible to restrain the seating member 1 from being dislocated in the longitudinal direction at the crotch of the user P.

The slider 41 provided on the upper end of each of the leg links 2L and 2R engages with a portion of the guide rail 32 which is positioned farther toward the rear than a line L1 which connects the second joint 5 of each of the leg links 2L and 2R and the longitudinal swing support point 3*a* (the curvature center of the guide rail 32) of the leg links 2L and 2R. This makes it possible to secure a forward swing stroke of each of the leg links 2L and 2R which follows the forward swing of each leg of the user P without the need for increasing the length of the guide rail 32 much. Incidentally, each of the front and rear ends of the guide rail 32 is provided with a stopper 32*a* for preventing the first link 4 from being detached.

The joint members 31 constituting the first joints 3 for the leg links 2L and 2R are swingably supported in the lateral direction by longitudinal support shafts 35, 35, which are respectively supported by a pair of front and rear support blocks 34, 34 installed at the lateral center of the bottom surface of the seating member 1, at hinge members 36, 36 attached to the longitudinal upper end portions of the support plates 33. Hence, each of the first joints 3 will have the degree of freedom which allows each of the leg links 2L and 2R to swing in the lateral direction in addition to the degree of freedom which allows the leg links 2L and 2R to swing in the longitudinal direction. This enables the user P to swing the legs outward.

Further, the joint member 31 for the left leg link 2L and the joint member 31 for the right leg link 2R are rotatably supported by the common support shafts 35. In other words, the lateral swing support point of the left leg link 2L and the lateral swing support point of the right leg link 2R are positioned on the same axis in the longitudinal direction.

According to the present embodiment, in the one-leg supporting state, the lateral swing support point of the leg link of a free leg, which is the action point of the weight of the leg link of the free leg, is positioned on the same axis line (the support shaft 35) as the lateral swing support point of a supporting leg, so that the seating member 1 is not subjected to a lateral turning moment about the lateral swing support point of the leg link of the supporting leg. This makes it possible to prevent the seating member 1 from rolling in the one-leg supporting state. Incidentally, the weight of the leg link of the free leg is transmitted to a floor surface through the intermediary of the leg link of the supporting leg, so that the weight of the leg link of the free leg does not act on the seating member 1.

Further, when the line connecting the longitudinal swing support point 3*a* of each of the leg links 2L and 2R in the first joint 3 and the third joint 7 is defined as a reference line L2 (refer to FIG. 2), each of the leg links 2L and 2R is formed to have a length which causes the second joint 5 to bend and project to the front of the reference line L2 when the user P is standing upright. Further, the height of the seating member 1 can be automatically adjusted to the user P by the control of the drive source 9. This obviates the need for manufacturing a device dedicated for each individual or the need for adjusting the lengths of the leg links, permitting versatility and reduced cost to be achieved.

Further, the slider 41 at the upper end of each of the leg links 2L and 2R has a projecting portion 42 composed of a plate member projecting toward the rear, which is opposite from the second joint 5 relative to the reference line L2 in the longitudinal direction, and the drive source 9 is mounted on the projecting portion 42. With this arrangement, the swing moment in the front tilting direction about the third joint 7, which is generated in each of the leg links 2L and 2R due to the weight of each of the leg links 2L and 2R except for the drive source 9 when the user P is standing upright, is cancelled by the swing moment in the opposite direction generated by the weight of the drive source 9. In other words, the drive source 9 functions as a counterweight, leading to a reduced swing moment of the entire leg links 2L and 2R including the drive sources 9. As a result, a forward pushing force acting on the seating member 1 is reduced, allowing stability to be secured.

Further, when the user P swings out a leg forward, a swing moment forward about the swing support point 3*a* in the longitudinal direction is generated due to the weight of the drive source 9, and this moment assists the forward swing of the leg. This arrangement makes it possible to eliminate the resistance felt when the leg is swung forward, which presents a problem when the leg link 2L or 2R is bent such that the second joint 5 projects to the front of the reference line L2. Furthermore, the distance between the drive source 9, which is heavy, and the swing support point 3*a* is shorter, resulting in a reduced inertial moment of the leg link 2L or 2R about the first joint 3. Hence, it is possible to prevent the legs of the user P from being subjected to the inertial moments of the leg links 2L and 2R, thus preventing the user P from feeling his/her legs heavy when walking.

The driving force generated by the drive source 9 is transmitted to the second joint 5 through the intermediary of a driving force transmitting means 91. The driving force transmitting means 91 is composed of a wire type transmitting mechanism using a wire 91a, which connects the second joint 5 and the drive source 9, to reduce weight and cost. As the driving force transmitting means 91, a parallel link mechanism wherein a portion of the second link 6 which is away from the second joint 5 uses a link connected in parallel to the first link 4, or a hydraulic transmitting mechanism which uses a hydraulic cylinder may be used.

Two wires 91a are led out from the drive source 9. When one wire 91a is pulled out of the drive source 9, the other wire 91a is pulled into the drive source 9. The drive source 9 is constructed of an electric motor and drive pulleys for the wires 91a driven by the motor. Each of the two wires 91a and 91a is passed through each of two guide tubes 91b and 91b disposed between a flange 43 formed in the vicinity of the second joint 5 of the first link 4 and the drive source 9. Pulleys 52 on the same axes as shafts 51 of the second joints 5 are secured to the second links 6, and the two wires 91a and 91a are wound around the pulleys 52 in directions opposite to each other, then the ends of the wires 91a are secured to the pulleys 52. Thus, the wires 91a and 91a are pulled out or pulled in by the drive sources 9, thus rotating the pulleys 52. The rotation causes the second links 6 to swing about the axes 51 of the second joints 5 relative to the first links 4, thereby bending or stretching the leg links 2L and 2R. Although not illustrated, a side surface of each of the pulleys 52 has an arcuate groove and each of the first links 4 has a projection which engages with the groove. This arrangement restricts the swing stroke of each of the second links 6 relative to each of the first links 4 to a predetermined range.

As illustrated in FIGS. 2 and 3, the third joint 7 is constructed of a free joint consisting of a yoke 71 connected to the lower end of the second link 6 through the intermediary of a two-axis force sensor 10 and a moving member 73, which is rotatably connected to a shaft 72 horizontally installed at the lower end of the yoke 71 and which is connected to the shaft 72 such that it can be tilted in the axial direction. Here, the aforesaid weight-free assisting force acts on the aforesaid reference line L2 connecting the swing support point 3a in the longitudinal direction of the leg link 2L or 2R at the first joint 3 and the third joint 7, as observed sideways. Further, the actual weight-free assisting force (more accurately, the resultant force of the weight-free assisting force and the force based on the weights of the seating member 1 and the leg link 2L or 2R) acting on the reference line L2 is calculated on the basis of the detected values of the two-axis direction forces detected by the force sensor 10.

The ground contact member 8 is equipped with a shoe and a highly rigid stirrup-shaped connection ring 82 incorporated in the shoe 81. A collar 83 is vertically provided on the upper surface of the connection ring 82, and the lower end of the moving member 73 of the third joint 7 is connected to the collar 83. Further, as illustrated in FIG. 2, an elastic plate 84 providing an insole of the shoe 81 rests on the lower hem of the connection ring 82, and the lower surface of the elastic plate 84 is provided with a pair of front and rear pressure sensors 85, 85 for detecting loads acting on the metatarsophalangeal joint (MP joint) and the heel of the foot of the user. Further, based on the detected values of the two pressure sensors 85, 85 of each of the ground contact members 8, the ratio of the load acting on each foot with respect to the total load acting on both feet of the user is calculated, and the value obtained by multiplying a set value of a weight-free assisting force, which is set beforehand, by the ratio of the load on each foot is defined as the control target value of the weight-free assisting force to be generated in each leg link. The drive source 9 is controlled such that the actual weight-free assisting force calculated on the basis of the detected value of the aforesaid force sensor 10 will be the control target value.

In the one-leg supporting state, a weight-free assisting force of a set value is generated only by the leg link of a supporting leg. In this case, the drive of the drive source of the leg link of a free leg may be stopped and the second joint 5 may be placed in a free rotation state. Alternatively, it is also possible to apply a force in a bending direction to the leg link of the free leg by the drive source so as to assist the lifting of the foot of the free leg.

Further, as illustrated in FIG. 3, the collar 83 on the upper surface of the connection ring 82 is disposed such that it is laterally shifted inward such that the position of the third joint 7 is laterally shifted inward from the width center of the ground contact member 8. With this arrangement, the lateral distance between the support shaft 35 and the third joint 7 is reduced, leading to a reduced lateral force acting on the ground contact member 8 and the seating member 1. This secures the stability of the ground contact member 8 and the seating member 1.

The above has described an embodiment of the present invention; however, the present invention is not limited to the aforesaid embodiment. For example, a single self-sustainable leg link vertically provided on a small cart-like ground contact member having a plurality of wheels may be connected to a connecting portion on the lower surface of a seating member, and the wheels may be driven in concert with the walking of a user. Further, to assist the walking of a user who has a problem with one leg because of a bone fracture or the like, only the leg link of the crippled leg of the user out of the right and left leg links 2L and 2R in the aforesaid embodiment may be kept and the other leg link may be omitted. Further, the drive sources for the second joints 5 and 5, which are the intermediate joints of the leg links 2L and 2R, may be mounted on a bracket installed at the rear of the seating member 1 rather than mounting them on the leg links 2L and 2R. Further, the drive sources may be omitted by providing urging means for urging the second joints 5 and 5 in a stretching direction (in the direction for increasing the distance between the ground contact member 8 and the seating member 1).

The invention claimed is:

1. A walking assistance device having a seating member on which a user can sit astride and a support member which supports the seating member,
    wherein the seating member comprises a front portion disposed at a longitudinal front end of the seating member, a rear portion disposed at a longitudinal rear end of the seating member, and a central portion longitudinally disposed between the front portion and the rear portion, said central portion having a lateral width which is less than a lateral width of the front portion and also less than a lateral width of the rear portion,
    the seating member front portion providing a backward movement prevention section for preventing the seating member from being displaced backward relative to the user sitting thereon, the backward movement prevention section constructed to come in contact with the inguinal region of the user.

2. The walking assistance device according to claim 1, wherein the backward movement prevention section is formed to have a bifurcate shape.

3. The walking assistance device according to claim 2, wherein the seating member rear portion provides a forward movement prevention section constructed to come in contact with the back of the body of the user to prevent the seating member from being dislocated forward.

4. The walking assistance device according to claim 1, wherein the backward movement prevention section is formed such that the degree of elasticity in a longitudinal direction is larger than the degree of elasticity in a lateral direction.

5. The walking assistance device according to claim 4, wherein the seating member rear portion provides a forward movement prevention section constructed to come in contact with the back of the body of the user to prevent the seating member from being dislocated forward.

6. The walking assistance device according to claim 1, wherein the seating member rear portion provides a forward movement prevention section constructed to come in contact with the back of the body of the user to prevent the seating member from being dislocated forward.

7. The walking assistance device according to claim 6, wherein the lateral width of the seating member rear portion forward movement prevention section is greater than the lateral width of the seating member front portion backward movement prevention section.

8. The walking assistance device according to claim 7, wherein the seating member rear portion forward movement prevention section is formed to arch vertically upwardly and laterally outwardly from the seating member central portion.

9. The walking assistance device according to claim 8, wherein the seating member front portion backward movement prevention section is formed to arch vertically upwardly and laterally outwardly from the seating member central portion.

10. The walking assistance device according to claim 7, wherein the seating member front portion backward movement prevention section is formed to arch vertically upwardly and laterally outwardly from the seating member central portion.

11. The walking assistance device according to claim 6, wherein the seating member rear portion forward movement prevention section is formed to arch vertically upwardly and laterally outwardly from the seating member central portion.

12. The walking assistance device according to claim 6, wherein the seating member front portion backward movement prevention section is formed to arch vertically upwardly and laterally outwardly from the seating member central portion.

13. The walking assistance device according to claim 6, wherein the seating member rear portion forward movement prevention section is constructed to come in contact with roots of legs of the user at a back side of the body of the user.

14. The walking assistance device according to claim 1, wherein the lateral width is measured in a direction perpendicular to a longitudinal direction of the seating member when the seating member is viewed from a top view.

* * * * *